Dec. 14, 1948.  F. NEMEC  2,456,425
DEVICE FOR THE MUTUAL AND DETACHABLE
SUPPORT OF TWO OBJECTS
Filed Dec. 30, 1946

INVENTOR.
Frantisek NEMEC
BY
Attorney

Patented Dec. 14, 1948

2,456,425

UNITED STATES PATENT OFFICE 2,456,425

DEVICE FOR THE MUTUAL AND DETACHABLE SUPPORT OF TWO OBJECTS

Frantisek Nemec, Prague-Brevnov, Czechoslovakia

Application December 30, 1946, Serial No. 719,166
In Czechoslovakia April 22, 1939

Section 1, Public Law 690, August 8, 1946
Patent expires April 22, 1959

4 Claims. (Cl. 248—28)

This invention is concerned with a detachable connecting, joining or suspending device, by means of which two objects may mutually support each other, the one being suspended from the other, or the one being supported by the other.

More specifically, the object of the invention is a device of light weight, for joining together detachably but reliably two objects which may be of smaller or larger size, such as for supporting by, or suspending from the walls of a room or other building structures, or from a piece of furniture, articles such as furniture or parts thereof, or machines or parts thereof, such as for suspending picture frames from a wall or for supporting one element upon another or for composing building elements, machine elements or furniture elements to a unit or to a set of units; or otherwise.

In accordance with the invention, the device for the mutual and detachable support of two objects comprises a bolt transversely and circumferentially grooved on its shaft surface and adapted to be secured to the one of the objects. The device further comprises, associated with the bolt, an apertured thin-walled holding structure to be disposed at the other of the two objects, e. g. secured or otherwise applied thereto, or integral therewith.

The grooves on the surface of the bolt shaft may be of any convenient number, at least two, or more than two in equal distances. The profile of the groove or grooves is substantially rectangular. The grooves are so spaced from one another that when the bolt is inserted into the aperture of the apertured thin-walled holding structure and tilted into inclined position it will bear against diametrically opposed edges of the aperture on the opposite faces thereof.

The grooves are so disposed that the bolt, when inserted into the aperture and tilted, will engage with one groove one edge of the aperture and with the other groove or respectively the succeeding or adjacent groove of the series the diametrically opposed edge of the aperture on the opposite face thereof. To this purpose, the diagonal distance between two succeeding grooves will be substantially equal to the distance between the bearing edges of the aperture. The two faces of the groove are each inclined relatively to the axis of the bolt at about 45°.

Preferably, the bolts are cylindrical and the circumferential grooves circular. The bolts may thus serve as rotatable suspending bolts, or may also be employed in the form of a suspending hook, or otherwise.

In order to describe more fully the nature of my invention, I now refer to the accompanying drawings which form part of this specification and which by way of example illustrate various embodiments of my invention. It will be readily understood, however, that the drawings are intended to be illustrative of the invention but not limitative of its scope and that the invention may be embodied in other forms without departing from the principle underlying my invention and from the ambit of my appended claims.

Figure 1:
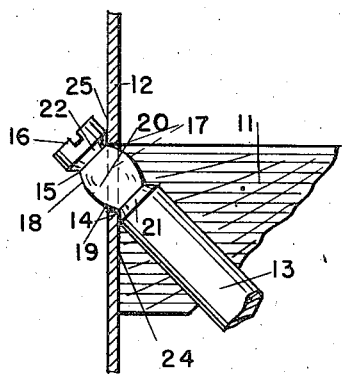
Fig. 1 is an elevational section of one embodiment of the invention.

In the embodiment illustrated in Fig. 1 an object 11, a picture frame or other piece of furniture for instance, is to be fixed to or mounted at an object 12, a wall for instance.

To this purpose a bolt 13 is provided at the object 11. As illustrated, the bolt is cylindrical and provided with two circumferential grooves 14, 15, each of which is formed by two faces perpendicular to each other. The faces 18, 19, of the two grooves 14, 15, which lie towards each other are rounded so as to pass into the shaft surface as shown at 20.

The depths of the grooves substantially correspond to the thickness of carrier wall 12 which with its aperture 17, of a shape substantially corresponding to the cross section of bolt 11, forms simultaneously the apertured thin-walled holding structure of the device of the invention.

Bolt 13 may be secured to object 11 by any convenient or conventional means, not shown on the drawings, for instance, the bolt may be driven into the object or screwed therein, the bolt being provided for this purpose suitably with a slotted head 16. Bolt 13 is secured in the part 11 in such a position, that the outwardly directed face 21 of groove 14 is in tangential contact with the one face 24 of wall 12 so that the axis of the bolt is inclined towards this wall at an angle of 45°.

In order to fix or mount the object or part 11 at the part 12, the protruding end of bolt 13 is inserted into aperture 17 in such a position of the bolt that its axis coincides with the axis of the aperture 17. The bolt will then be tilted into the position shown in Fig. 1 so that face 22 of groove 15 bears against the upper edge of aperture 17 at 25 of wall 12 and face 21 bears against the diametrically opposed or lower edge of the aperture 17 at the opposite face 24 of wall 12.

In this way bolt 13 is held against any unintentional displacement.

In order to disconnect the parts from each other, part or object 11 is tilted back until bolt 11 arrives at its horizontal position whereupon it may be withdrawn from aperture 17.

Figure 2:
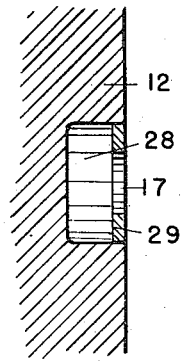
Fig. 2 is an elevational section of a modification of a holding structure.
Figure 3:
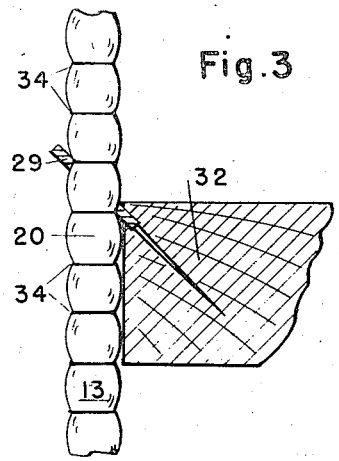
Fig. 3 is an elevational section of another embodiment of the invention.

If the object 12 is of considerable thickness, a socket 28 is formed therein, as shown in Fig. 2, which is closed by a ring disc 29, preferably of rigid material, such as metal. The ring disc may be secured in the socket by any convenient means—not shown in the drawings—such as by being screwed in place.

If the connection between the two objects is to be adjustable, the bolt is provided with a series of equidistant grooves 34, which are rounded as described hereinbefore with reference to grooves 14 and 15. The bolt 13 may then be held in the other one (32) of the two objects to be joined together, by means of holding ring 29 appropriately secured in part 32, the position being arbitrarily adjusted by selection of an appropriate pair of adjacent grooves 34 in the manner described with reference to Fig. 1.

I claim:

1. A device for the mutual and detachable support of two objects comprising a bolt adapted to be secured with its one end to the one of said objects and, associated with said bolt, an apertured thin-walled structure disposed at the other of said objects, said bolt having on its shaft at least two circumferential grooves of substantially rectangular profile, the faces of said profile each inclined relatively to the axis of said bolt at about 45°; the depths of said faces substantially corresponding to the thickness of the wall of said apertured thin-walled structure; said grooves spaced from each other at a distance to allow said bolt when inserted into the aperture of said apertured thin-walled holding structure and tilted into inclined position, to engage by means of one of said grooves one edge of said aperture and by means of the other of said grooves the diametrically opposed edge of said aperture on the opposite face thereof; said bolt thus being held in position relatively to said apertured thin-walled holding structure against unintentional displacement.

2. A device as set forth in claim 1 wherein said bolt is cylindrical, those of said faces of adjacent groove profiles which lie towards one another having rounded edges so as to pass into the shaft surface of said bolt.

3. A device as set forth in claim 1 wherein said apertured thin-walled holding structure is a ring disc of rigid material, and said object whereat said holding structure is disposed, has a hollow space shaped therein, adapted to receive the head of said grooved bolt, said hollow space further adapted to be closed by said ring disc.

4. A device for the mutual and detachable support of two objects comprising a bolt adapted to be secured to the one of said objects and, associated with said bolt, an apertured thin-walled holding structure disposed at the other of said objects, said bolt having on its shaft surface a series of equidistant circumferential grooves of substantially rectangular profile; said grooves spaced from one another at a distance so as to allow said bolt when inserted into the aperture of said apertured thin-walled holding structure and tilted into inclined position, to engage by means of one of said grooves one edge of said aperture and by means of the other of said grooves the diametrically opposed edge of said aperture on the opposite face thereof; said bolt thus being held in position relatively to said apertured thin-walled holding structure against unintentional displacement.

FRANTISEK NEMEC.

REFERENCES CITED

The following references are of record in the file of this patent:

UNITED STATES PATENTS

| Number | Name | Date |
|---|---|---|
| 999,961 | Colas | Aug. 8, 1911 |